US006470224B1

(12) United States Patent
Drake et al.

(10) Patent No.: US 6,470,224 B1
(45) Date of Patent: Oct. 22, 2002

(54) CONFIGURABLE AIRCRAFT POWER SYSTEM

(75) Inventors: Paul R. Drake, Peoria, AZ (US); Thomas J. Doubek, Rockford, IL (US); Robert H. Mierow, Cherry Valley, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/411,813

(22) Filed: Oct. 1, 1999

(51) Int. Cl.$^7$ .............................................. G05B 11/01
(52) U.S. Cl. .................. 700/22; 700/286; 700/292; 701/3
(58) Field of Search .................. 700/22, 286, 292–294, 700/297, 298; 361/2, 93.2, 100; 701/3, 35, 29; 307/29, 9.1, 38–40, 86; 710/8; 713/300, 310; 323/255, 340; 370/386

(56) References Cited

U.S. PATENT DOCUMENTS

| | | | |
|---|---|---|---|
| 3,842,249 A | 10/1974 | Geyer et al. ........... 235/151.21 |
| 4,106,013 A | 8/1978 | Cronin ........................ 340/27 |
| 4,403,292 A | 9/1983 | Ejzak et al. ................. 364/492 |
| 4,551,632 A | 11/1985 | Jourdan et al. ................. 307/9 |
| 4,777,607 A | 10/1988 | Maury et al. ............... 364/492 |
| 5,270,931 A | 12/1993 | Appleford .............. 364/424.01 |
| 5,386,363 A | 1/1995 | Haak et al. ............ 364/424.01 |
| 5,422,517 A | 6/1995 | Verney et al. ................ 307/29 |
| 5,583,419 A | 12/1996 | Haller ............................ 322/8 |
| 5,596,263 A | * 1/1997 | Zavis et al. .................. 323/255 |
| 5,604,421 A | 2/1997 | Barnsley ....................... 322/22 |
| 5,732,281 A | * 3/1998 | Summers et al. .............. 710/8 |
| 5,752,047 A | 5/1998 | Darty et al. ........... 395/750.01 |
| 5,761,625 A | 6/1998 | Honcik et al. ................ 701/14 |
| 5,764,502 A | 6/1998 | Morgan et al. ............... 363/65 |
| 5,844,329 A | 12/1998 | Bailey et al. ................. 307/66 |
| 5,859,845 A | * 1/1999 | Oniishi et al. .............. 370/386 |

* cited by examiner

Primary Examiner—Maria N. Von Buhr
Assistant Examiner—Steven R. Garland
(74) Attorney, Agent, or Firm—Marshall, Gerstein & Borun (57) ABSTRACT

An aircraft power system includes a secondary power distribution assembly (SPDA), a programmable solid state power controller (SSPC) disposed within the SPDA and a non-volatile memory disposed within the SPDA and adapted to store configuration information for the programmable SSPC. The configuration information stored by the non-volatile memory may include the name and current rating of the SSPC and whether that SSPC is enabled or disabled.

4 Claims, 8 Drawing Sheets

```
            RENAME ENTRY
[1L]                                    [1R]
[2L]   SPDA2 DCB7  4    5 A             [2R]
[3L]              TO                    [3R]
[4L]                   5 A              [4R]
[5L]                         WRITE>     [5R]
[6L]  <RENAME SPARE CB                  [6R]
       ADDED GADET
```

FIG. 11

```
           CONFIRM NEW NAME
[1L]           RENAME                   [1R]
[2L]   SPDA2 DCB7  4    5 A             [2R]
[3L]              TO                    [3R]
[4L]   ADDED GADGET    5 A              [4R]
[5L]                         CONFIRM>   [5R]
[6L]  <RENAME SPARE CB                  [6R]
```

CONFIGURABLE AIRCRAFT POWER SYSTEM

FIELD OF THE INVENTION

The present invention relates generally to aircraft power systems and, more particularly, to a configurable aircraft secondary power system, the components of which a user can enable, disable and rename.

BACKGROUND OF THE INVENTION

An aircraft typically includes a power system that generates and supplies power to various aircraft systems and subsystems. For example, a power control and distribution system may supply power to aircraft de-icing and avionics subsystems to enable those systems to perform the respective functions-thereof.

Power control systems may include one or more secondary power distribution assemblies (SPDA's) each having several solid state power controllers (SSPC's) that supply power to various electrical loads, such as aircraft systems and subsystems. Each SSPC is a hardware component that conceptually includes a virtual switch and a virtual circuit breaker, both of which must be enabled (or closed) for the SSPC to provide power to a particular electrical load.

Software executed by an SPDA controls the status (i.e., enabled or disabled) of the virtual circuit breakers of all SSPC's within that SPDA. An SPDA may have multiple spare SSPC's that are not initially used in aircraft operation but which may be needed in the future should additional systems or subsystems be added to the aircraft. Spare SSPC's are disabled by software that is hard-coded into the SPDA and cannot be changed without changing the software within the SPDA. Accordingly, an SSPC designated as a spare SSPC will remain as such unless the SPDA software is changed to enable that SSPC.

Each SSPC is named within the SPDA. For example, a spare SSPC may be named "SPDA2 DB7 4," which indicates that the spare SSPC is located in SPDA2 and is connected to DC bus 7 at output 4. In another case, an active SSPC corresponding to a windshield heater may be named "L WSHLD HTRA." Like the enable/disable features, the names of SSPC's are conventionally hard-coded into the SPDA. Accordingly, SSPC names may not be changed without changing the software in the SPDA.

An administrative body such as the Federal Aviation Administration (FAA) or the Canadian Aviation Administration (CAA) must certify each component used in an aircraft. When an SPDA containing particular software is certified, that SPDA including the software therein cannot be altered without going through a long and expensive recertification process. Although a simple software change may enable a spare SSPC or rename an SSPC, any software change requires recertification the SPDA having the new software.

SUMMARY OF THE INVENTION

According to one aspect of the present invention, an aircraft secondary power system includes a secondary power distribution assembly (SPDA), a programmable solid state power controller (SSPC) disposed within the SPDA and a non-volatile memory, such as an electrically erasable programmable read only memory, disposed within the SPDA and adapted to store configuration information for the programmable SSPC.

The aircraft secondary power system may also be considered to include a virtual circuit breaker disposed within the programmable SSPC. The configuration information may include a name of the programmable solid state power controller and an indication that the programmable solid state power controller is enabled or disabled.

The aircraft secondary power system may also include a user interface adapted to allow a user to enter a name of the programmable SSPC. Additionally, the user interface may be adapted to allow a user to enable or disable the programmable SSPC.

According to a further aspect of the present invention, an aircraft secondary power system includes an SPDA, a programmable SSPC disposed within the SPDA, and a multi-function control and display unit (MCDU) coupled to the SPDA. The MCDU is adapted to receive configuration information for the programmable SSPC from a user and to pass that information to the SPDA. The aircraft secondary power system also includes a non-volatile memory disposed within the SPDA and adapted to store the configuration information.

Other aspects and advantages of the present invention will become apparent upon consideration of the following drawings and detailed description of the preferred embodiments.

DETAILED DESCRIPTION OF THE PREFERRED EMBODIMENT

The present invention is directed to an aircraft secondary power system that provides a user, such as maintenance or aviation personnel, the ability to enable spare SSPC's. The present invention also provides a user the ability to change the names that the SPDA uses when referring to previously spare SSPC's.

Figure 1:
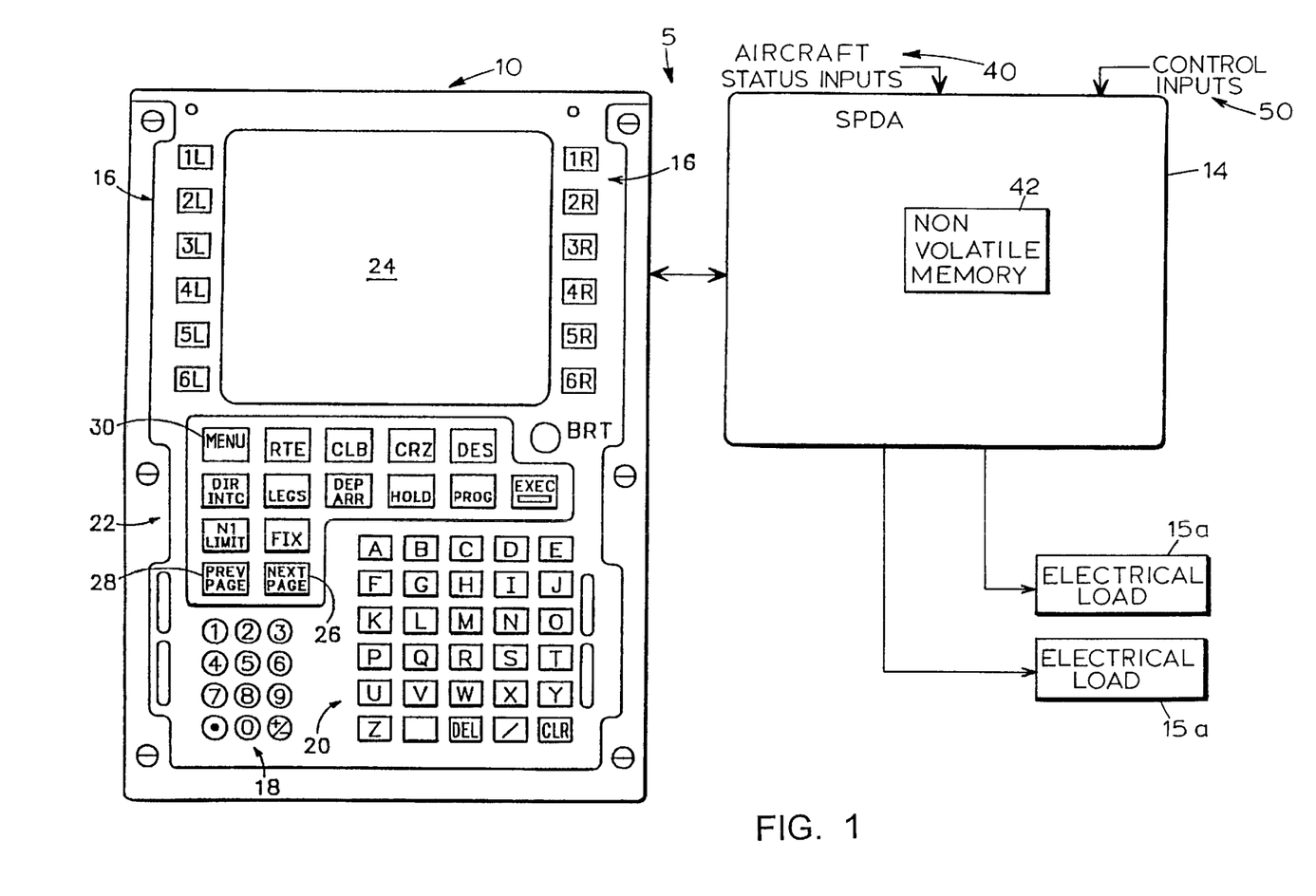
FIG. 1 is a block diagram of an aircraft power system incorporating the present invention together with a multi-function control and display unit (MCDU)

Referring to FIG. 1, an aircraft secondary power system 5 may generally include a multifunction control and display unit (MCDU) 10, a secondary power distribution assembly (SPDA) 14 and a number of electrical loads 15a, 15b all of which are disposed within an aircraft. As will be appreciated by those of ordinary skill in the art, the electrical loads 15a, 15b may be aircraft systems or subsystems that draw electrical power in use. Additionally, while only two electrical loads 15a, 15b are shown, many more electrical loads may be present.

The MCDU 10 is operatively coupled to the SPDA 14 and provides a user interface through which a user, such as a maintenance person, can interact with the SPDA 14. The MCDU 10 may communicate with the SPDA 14 using an ARINC 429 serial bus using an ARINC 739 protocol. Alternatively, such communication may take place over a ARINC 629 bus or a Mil-Std-1553 bus using any suitable communication protocol. The MCDU 10 includes a number of keys that allow the user to provide information to the SPDA 14. More specifically, the MCDU 10 includes two rows of select keys 16, numeric keys 18, alpha keys 20, function keys 22 and a display screen 24. The display screen 24 may be a cathode ray tube, a liquid crystal display or any other suitable type of display on which the SPDA 14 can provide textual information to the user. The MCDU 10 also includes NEXT PAGE and PREVIOUS PAGE keys 26, 28 that allow the user to access multiple pages of information that may be provided to the display screen 24. A MENU key 30 allows the user to initialize various settings in the SPDA 14. The two rows of select keys 16 are disposed on either side of the display screen 24 and allow the user to select options that are displayed on the display screen 24 next to particular select keys 16. The individual keys in the row of select keys 16 on the left of the display screen 24 are referred to from top to bottom as 1L–6L. Similarly, the individual keys in the row of select keys 16 on the right side of the display screen 24 are referred to from top to bottom as 1R–6R.

The SPDA 14 receives aircraft status inputs 40 from various sensors disposed throughout the aircraft. Aircraft status inputs 40 may include, for example, a representation of the weight on the aircraft wheels, the air speed of the aircraft or the ground speed of the aircraft. Of particular interest is the fact that the SPDA 14 includes a non-volatile memory (NVM) 42 that stores numerous items of information. In accordance with the teachings of the present invention, the non-volatile memory 42 may be 128K in size and may store status and name information regarding any used or spare SSPC's. The SPDA 14 provides status and name information to the MCDU 10 so that the MCDU 10 can display such information to a user when the user desires. For example, status information allows the user to see which of the SSPC's are enabled and disabled. Prior systems had status and name information hard-coded into the software for the SPDA 14.

The present invention allows the status and name information to be changed without changing the software in the SPDA 14, thereby eliminating the need to recertify the SPDA 14 when the status or name information is changed. Further detail regarding the changing and the storage of the status and name information is described below in conjunction with FIGS. 3–12.

The NVM 42 located in the SPDA 14 provides status information as to which SSPC's are enabled and which SSPC's are disabled. The NVM 42 in the SPDA 14 stores and provides status and feedback information to the MCDU 10 to keep the user apprised of the operation of the SPDA 14. In addition to the aircraft status inputs 40, the SPDA 14 receives control inputs 50, which may be commands from flight personnel to provide power to various systems or subsystems of the aircraft. For example, a pilot's command to deploy the landing gear of the aircraft would be represented as a control input 50. Collectively, SPDA status information from the NVM 42 the control inputs 50 are referred to as logic inputs.

The SPDA 14 generates and distributes power to various aircraft systems and subsystems based on the logic inputs. The two logic inputs must be enabled for power to flow to a particular system or subsystem. Only when the SPDA status information from the NVM 42 and the control inputs 50 indicate that power should be provided from the SPDA 14, will power will be provided to a particular electrical load 15a or 15b.

Figure 2:
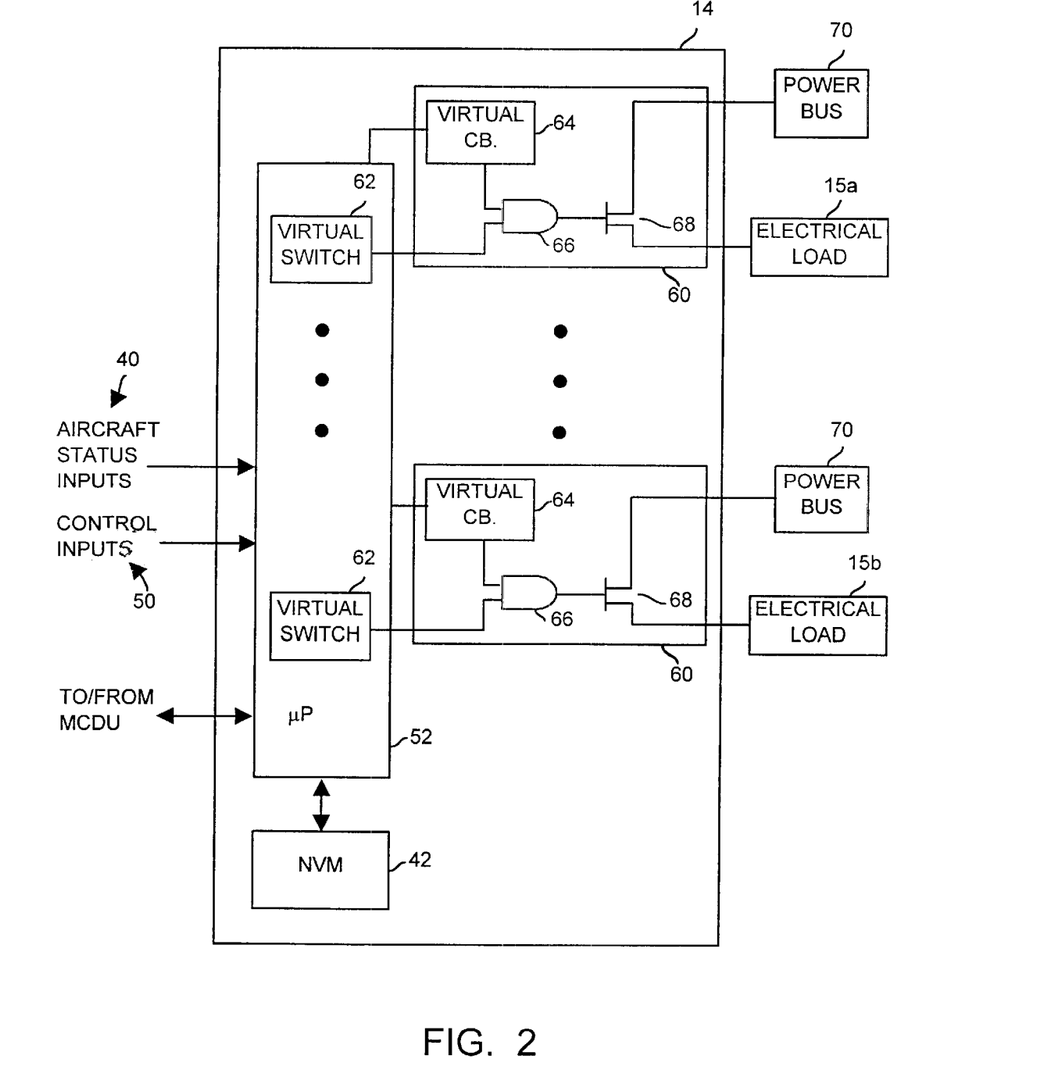
FIG. 2 is a block diagram of a secondary power distribution assembly (SPDA) utilized in the power system of FIG. 1.

As shown in FIG. 2, the SPDA 14 includes the NVM 42, a processor 52 and a plurality of SSPC's 60, only two of which are shown. The processor 52 receives the aircraft status inputs 40 and the control inputs 50 and is in communication with the MCDU 10. MCDU 10 receives and displays the status and name information that is stored in the NVM 42 and communicated to the MCDU 10 by the processor 52. The MCDU 10 may display the status and name information from the processor 52 to the user on the display 24.

Each SSPC 60 is programmable and has a corresponding virtual switch 62 in the processor 52 and a corresponding virtual circuit breaker 64 that is controlled by the processor 52 in a known manner. On power up, the processor 52 retrieves the status and name information from the NVM 42 and controls the virtual circuit breaker 64 appropriately based on that information. During processor 52 operation, the processor 52 receives the control inputs 50 and based on those inputs controls the state of the virtual switch 62. Each SSPC 60 further includes an AND gate 66 and a power semiconductor 68 coupled to a power bus 70. The virtual switch 62 and the virtual circuit breaker 64 are each communicatively coupled to the AND gate 66, which is coupled to and controls the power semiconductor 68. When the outputs of both the virtual switch 62 and the virtual circuit breaker 64 are enabled, the AND gate 66 produces an output signal that is a logical high, which enables the power semiconductor 68. When the power semiconductor 68 is enabled, it connects the power bus 70 to the electrical load 15a, 15b.

In some embodiments, the power bus 70 may be a direct current (DC) bus, while in other embodiments the power bus 70 may be an alternating current (AC) bus. The processor 52 may be embodied in an INTEL 80168 processor or any other suitable processor.

The SSPC 60 is a programmable device that is controlled by the processor 52 of the SPDA 14. The processor 52 not only controls whether the virtual circuit breaker 64 is enabled or disabled, but may also include information regarding an over current trip level of the virtual circuit breaker 64, which is retrieved from the NVM 42 and programmed into the virtual circuit breaker 64 by the processor 52. For the purposes of this description it will be assumed that an SSPC is enabled when its associated virtual circuit breaker is enabled (or closed) and that an SSPC is disabled when its virtual circuit breaker is disabled (or open). If the virtual circuit breaker 64 is enabled and is not tripped due to an over current, the electrical load 15a or 15b is coupled to the power bus 70 via the power semiconductor 68, which is controlled by virtual switch 62 and the virtual circuit breaker 64. In the event that the virtual circuit breaker 64 is not enabled, the power bus 70 will not be coupled from the virtual circuit breaker 64, because the virtual circuit breaker 64 is effectively an open circuit.

Figure 3:
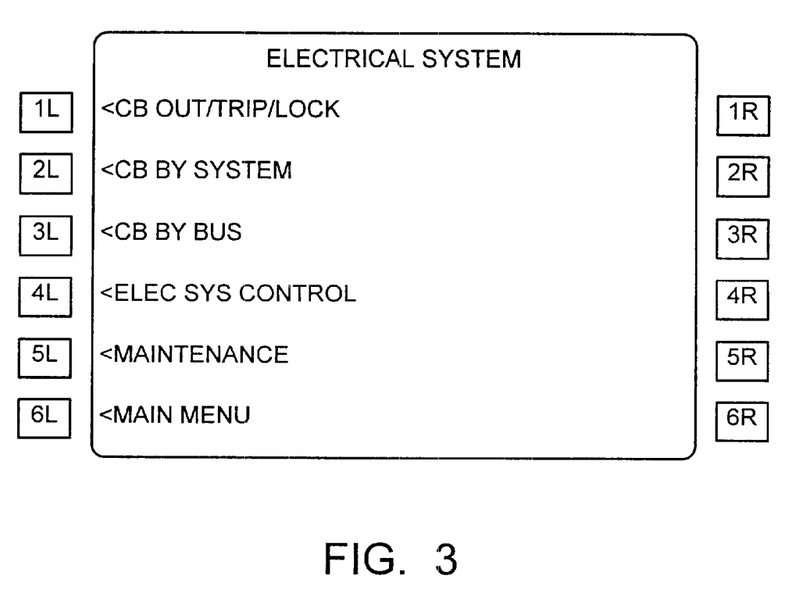
FIG. 3 is an illustration of an electrical system display screen displayed by the MCDU of FIG. 1.
Figure 4:
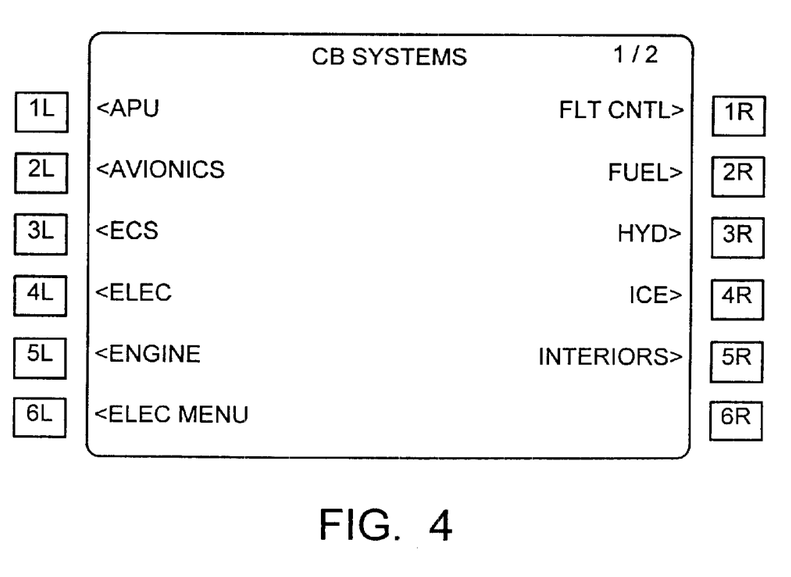
FIGS. 4–7 are illustrations of display screens displayed by the MCDU of FIG. 1 and used to access configuration options.
Figure 5:
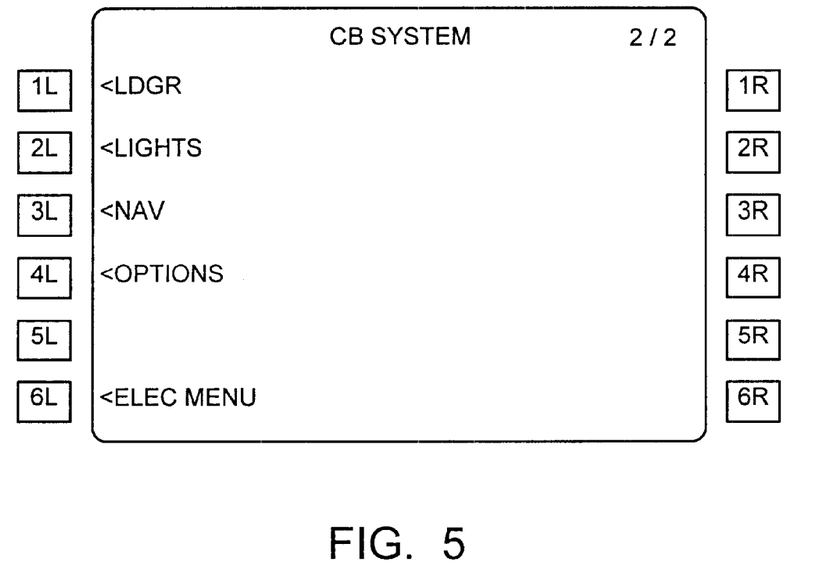

FIG. 3 illustrates an ELECTRICAL SYSTEM menu that is presented on the display screen 24 when a user presses the MENU key 30. To configure which SSPC's will be enabled in an aircraft power system, a user selects the prompt <CB BY SYSTEM by depressing the select key 2L. The CB SYSTEMS menu, as shown in FIGS. 4 and 5, includes two pages (½ and ⅔) of electrical systems that may be selected. The NEXT PAGE and PREV PAGE keys 26, 28 may be used to toggle between the two pages of menus shown. Page ½ of the CB SYSTEMS menu includes an ICE>prompt, which corresponds to an ice and rain subsystem that operates to de-ice the aircraft when it is enabled. The depression of the 4R key selects the ICE>prompt, which brings the user to a CB SYSTEMS-ICE menu shown in FIG. 6.

Figure 6:
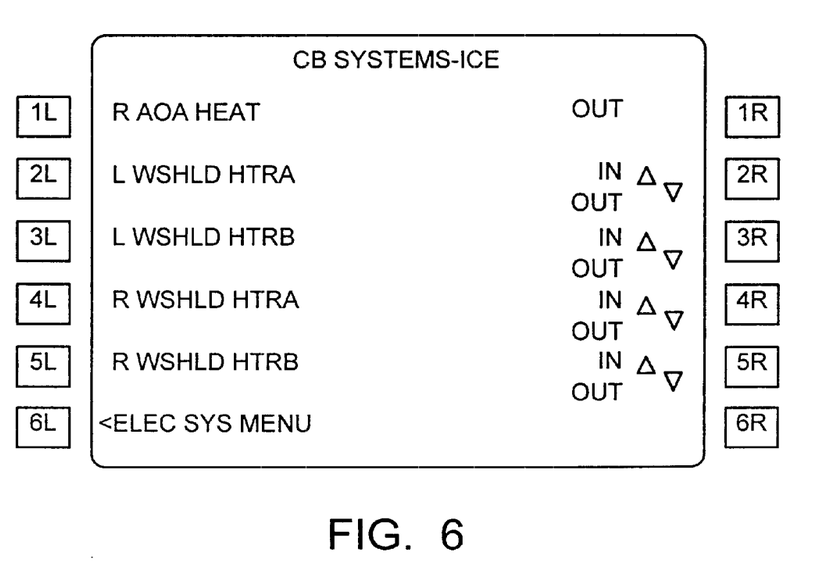
Figure 7:
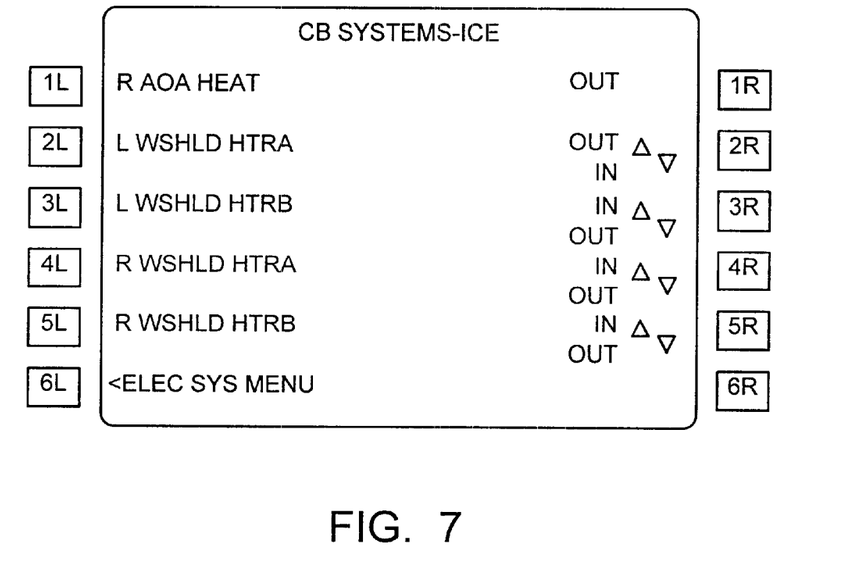

The CB SYSTEMS-ICE menu contains a list of five subsystems of the ICE system for which virtual circuit breakers may be enabled and disabled using select keys 1R–15R. The select keys 1R–15R toggle the virtual circuit breakers associated with each of the subsystems listed. For example, the user may toggle the status of the virtual circuit breaker (and an SSPC) associated with the L WSHLD HTRA between an enabled or IN state and a disabled or OUT state by depressing select key 2R. As shown in FIG. 6, the virtual circuit breaker for subsystem L WSHLD HTRA is enabled or IN. After the depression of select key 2R, the virtual circuit breaker associated with the L WSHLD HTRA subsystem is as shown in FIG. 7, which shows that the L WSHLD HTRA subsystem is disabled or OUT.

The ability to enable and disable virtual circuit breakers as described above only applies to SSPC's that are not designated as spare. In accordance with a second aspect of the present invention, it is possible to rename and reconfigure spare SSPC's without replacing the software within the SPDA 14 because the names and configurations of the spare SSPC's are stored in the non-volatile memory 42. Once an SSPC has been renamed, it is no longer considered a spare SSPC.

Figure 8:
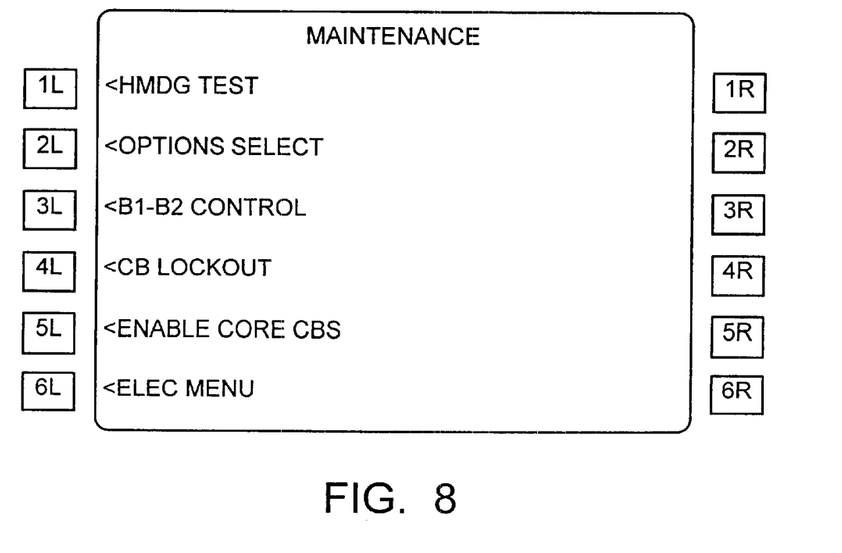
FIGS. 8–12 are illustrations of maintenance display screens displayed by the MCDU of FIG. 1 and used to rename solid state power controllers (SSPC's) in accordance. with the teachings of the present invention.

Returning to FIG. 3, the ELECTRICAL SYSTEM menu includes a <MAINTENANCE prompt that a user can select by depressing the 5L key. The <MAINTENANCE prompt designates a maintenance utility that can only be used if the SPDA 14 determines that it is safe to rename SSPC's. For example, the SPDA 14 may examine the aircraft status inputs 40 to determine that there is weight on the aircraft wheels, that air speed is zero and that ground speed is zero, thereby determining that the aircraft is on the ground and not moving before a user is allowed to use the maintenance utility. Depression of key 5L leads to a series of menus that allow a user to name spare SSPC's. Upon depressing the 5L key, a MAINTENANCE menu, as shown in FIG. 8, is presented on the display screen 24. The MAINTENANCE menu includes an <OPTIONS SELECT prompt that may be selected by depressing the 2L key.

Figure 9:
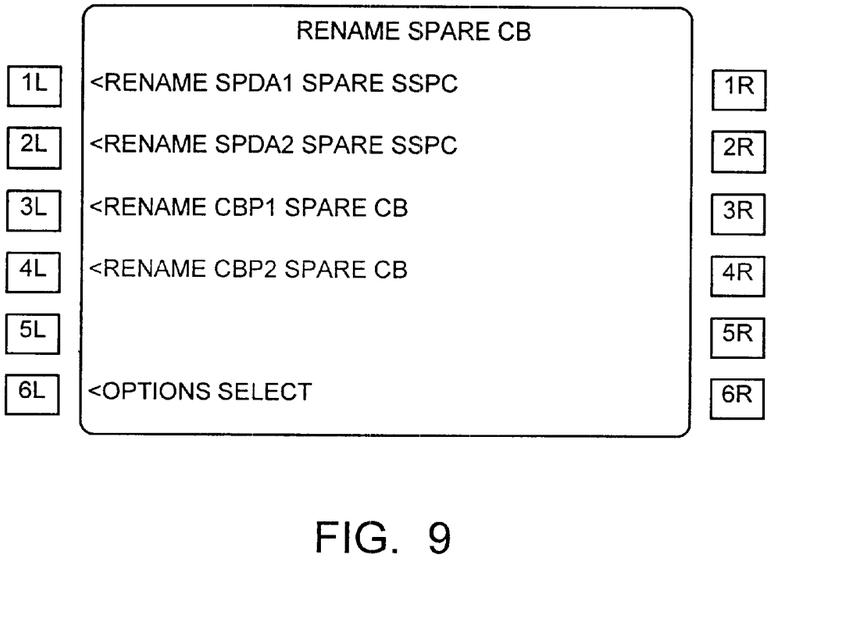
Figure 10:
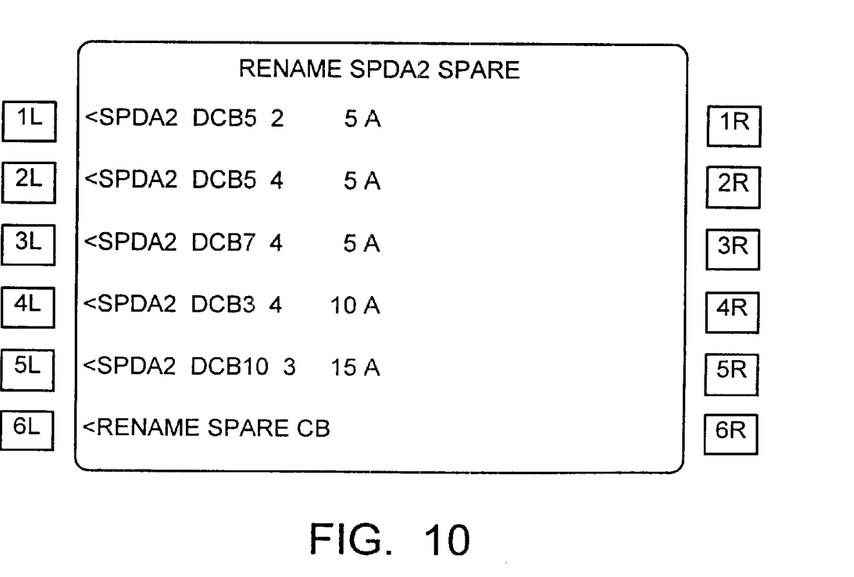

Depression of the 2L key causes a RENAME SPARE CB menu to be presented to the user on the display screen 24. The RENAME SPARE CB menu, as shown in FIG. 9, allows the user to rename any spare SSPC in either SPDA1 or SPDA2 and also allows the user to rename any spare physical circuit breaker in either aircraft circuit breaker panel CBP1 or CBP2. The selection of the prompt <RENAME SPDA2 SPARE SSPC causes a RENAME SPDA2 SPARE menu, as shown in FIG. 10, to be presented on the display screen 24. This menu includes a list of the spare SSPC's in SPDA2, the bus to which the spare SSPC's are connected and the current ratings of the virtual circuit breakers associated with the spare SSPC's. One prompt <SPDA2 DCB7 4 5A, for example, indicates that a spare SSPC of SPDA2, which is connected to output 4 of DC bus 7 has a current rating of 5 amperes, is associated with key 3L.

Figure 11:
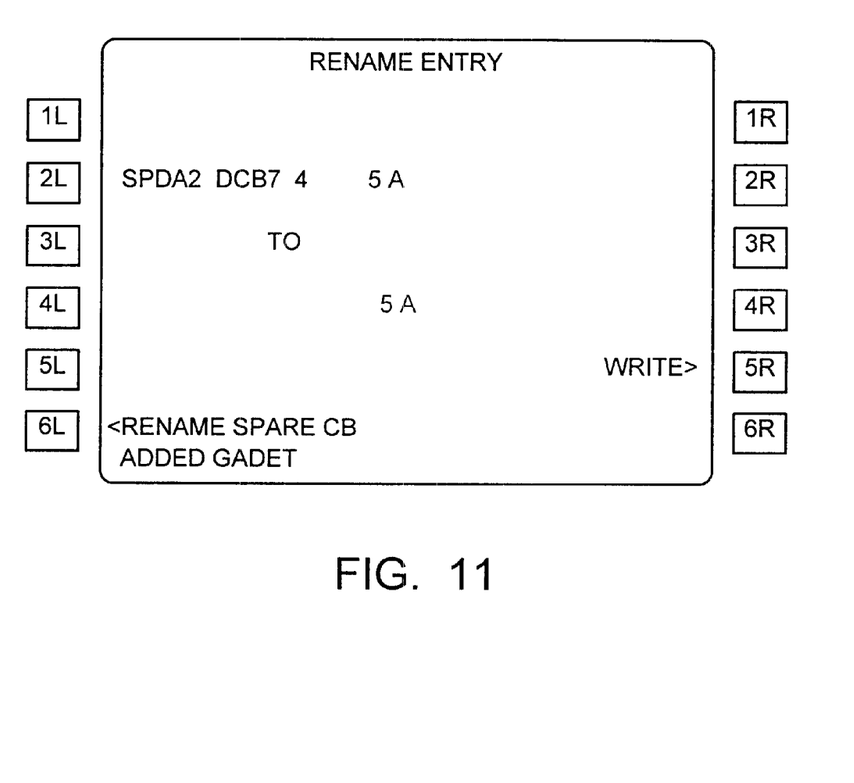

When the user depresses key 3L, a RENAME ENTRY menu, as shown in FIG. 11, is presented to the user on the display screen 24. At this screen the user enters the name to which he/she desires SPDA2 DCB7 4 to be changed. A desired name may be entered using the numeric and alpha keys 18, 20 of the MCDU 10. For example, as shown in FIG. 11, a user may desire to rename SPDA2 DCB7 4 to ADDED GADGET, which is a name entered by the user. After entering the desired name (e.g., ADDED GADGET), the user depresses the 6L key, which is associated with the prompt <RENAME SPARE CB.

Figure 12:
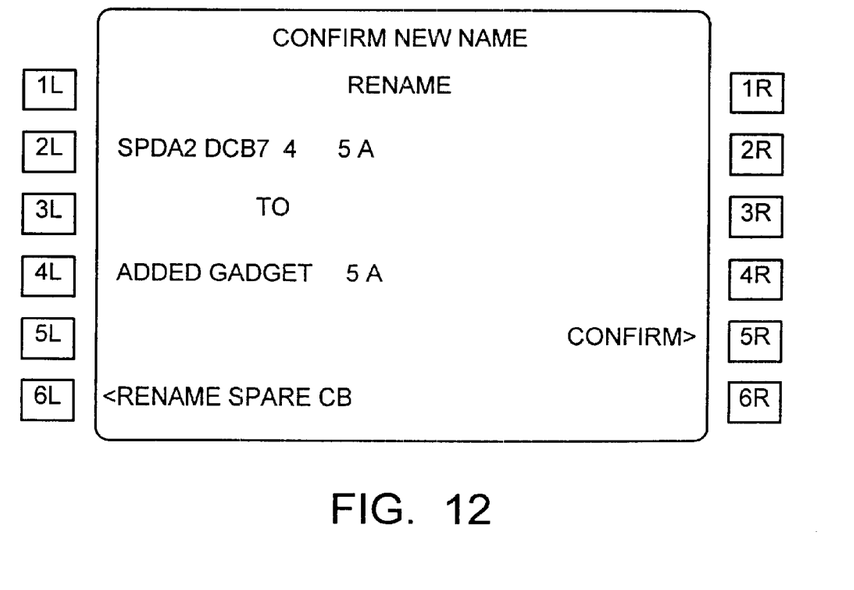

After the key 6L is depressed, a CONFIRM NEW NAME menu, as shown in FIG. 12, displays the name that is to be changed and the name to which it is to be changed. For example, as shown in FIG. 12, SPDA2 DCB7 4 is to be renamed as ADDED GADGET. If the user desires this renaming, he/she depresses the key 5R, which is associated with the prompt CONFIRM>. Upon depressing the key 5R, the new name for the spare SSPC is written into the non-volatile memory 42. After an SSPC has been renamed, it is no longer a spare and may be enabled or disabled as described in conjunction with FIGS. 3–8.

Although the above description pertains to changing the name of an SSPC, one having ordinary skill in the art will readily appreciate that the teaching of the present invention may be applied to other SSPC configuration options. For example, the current ratings of SSPC's may be stored in the non-volatile memory 42 and, therefore, may be changed without the need to change the SPDA 14 software. Flight or maintenance personnel could change the current ratings of the SSPC's using the MCDU 10 just as the names of SSPC's may be changed by a user.

Figure 13:
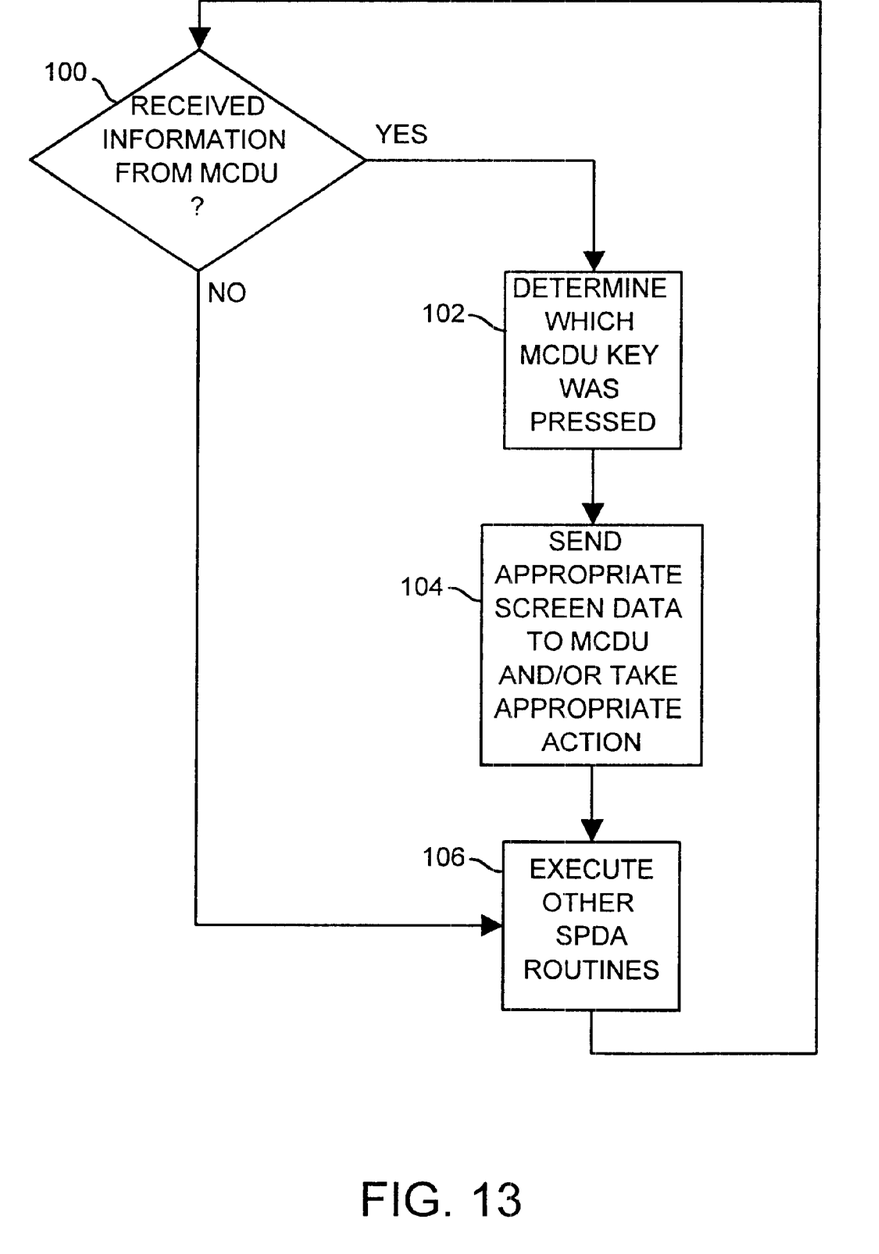
FIG. 13 is a flow diagram illustrating some of the functions of the SPDA.

The software of the SPDA 14 executes a 10 millisecond (ms) loop, only a portion of which is shown in detail in FIG. 13. As the software operation begins, a block 100 determines if the SPDA 14 has received any information, such as a key press, from the MCDU 10. If the block 100 determines that information has been received by the SPDA 14, control is passed to a block 102. The block 102 determines which MCDU 10 key was pressed and thereafter passes control to a block 104. The block 104 causes the SPDA 14 to send appropriate screen data to the MCDU 10 and/or take appropriate action. Appropriate screen data may include data representative of further menu screens that allow the user to make further selections or to enter additional information. For example, some such screens may include the screens shown in FIGS. 3–12. Some such screens may also allow a user to enter a name to which a spare SSPC is to be renamed or may provide an interface that allows the user to enable or disable a particular SSPC. Appropriate action taken by the SPDA 14 may include writing information to the NVM 42 to enable, disable or rename a particular SSPC.

After the block 104 has sent appropriate display data to the MCDU 10 and/or taken appropriate action, control passes to a block 106. The block 106 is representative of other routines that may be executed by the SPDA 14 during its operation. Such routines may include reading the control inputs 50 and controlling the SSPC's 60 in a conventional manner. Eventually, when the routines represented by the block 106 are complete, control is passed from the block 106 back to the block 100 to complete the software loop. If, when program flow reaches the block 100, the block 100 determines that no information is received at the SPDA 14 from the MCDU 10, control passes from the block 100 directly to the block 106.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. An aircraft secondary power system, comprising:

a secondary power distribution assembly;

a programmable solid state power controller disposed within the secondary power distribution assembly; and a non-volatile memory disposed within the secondary power distribution assembly and adapted to store configuration information for the programmable solid state power controller, wherein the configuration information comprises an indication that the programmable solid state controller is disabled.

2. The aircraft secondary power system of claim 1, further comprising a user interface adapted to allow a user to enable the programmable solid state power controller.

3. The aircraft secondary power system of claim 1, further comprising a user interface adapted to allow a user to disable the programmable solid state power controller.

4. An aircraft secondary power system, comprising:

a secondary power distribution assembly;

a programmable solid state power controller disposed within the secondary power distribution assembly;

a multifunction control and display unit communicatively coupled to the secondary power distribution assembly and adapted to receive configuration information for the programmable solid state power controller from a user; and a non-volatile memory disposed within the secondary power distribution assembly and adapted to store the configuration information, wherein the configuration information comprises an indication that the programmable solid state power controller should be disabled.

* * * * *